W. DALTON.
TRACK SCALE.
APPLICATION FILED FEB. 23, 1911.
1,028,194.
Patented June 4, 1912.
3 SHEETS—SHEET 3.
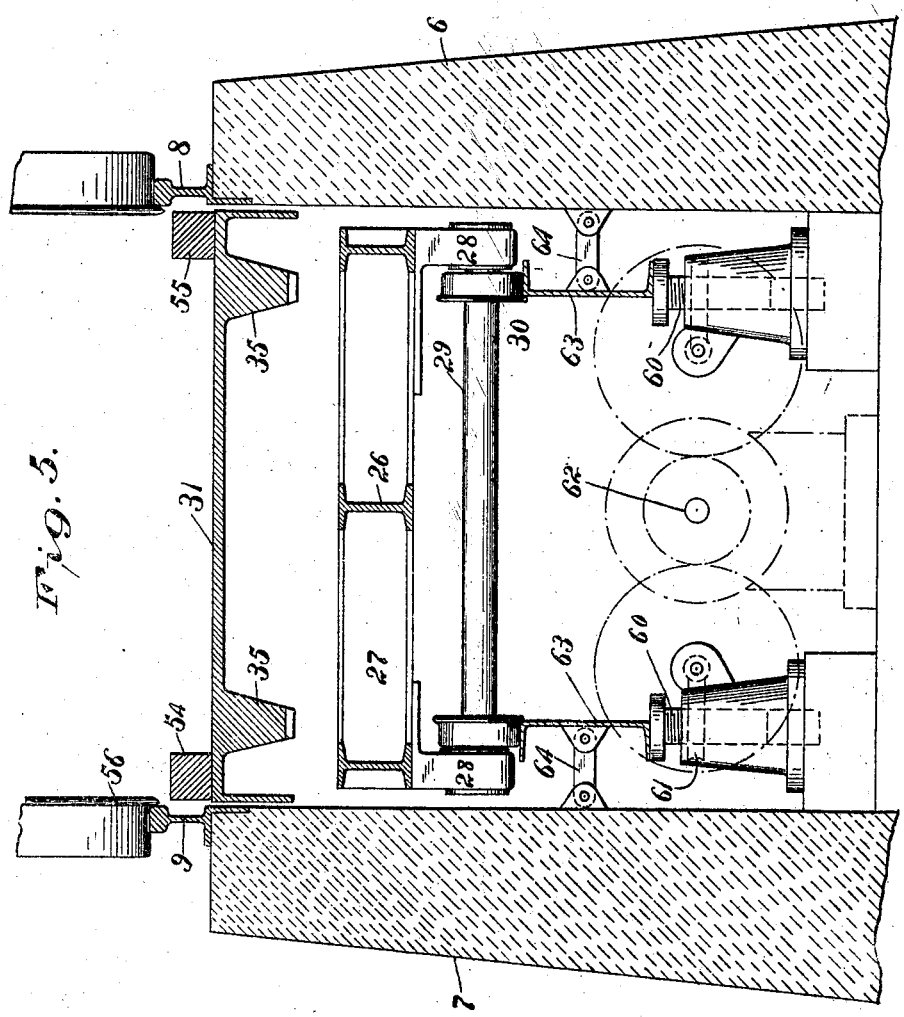
WITNESSES
INVENTOR
William Dalton

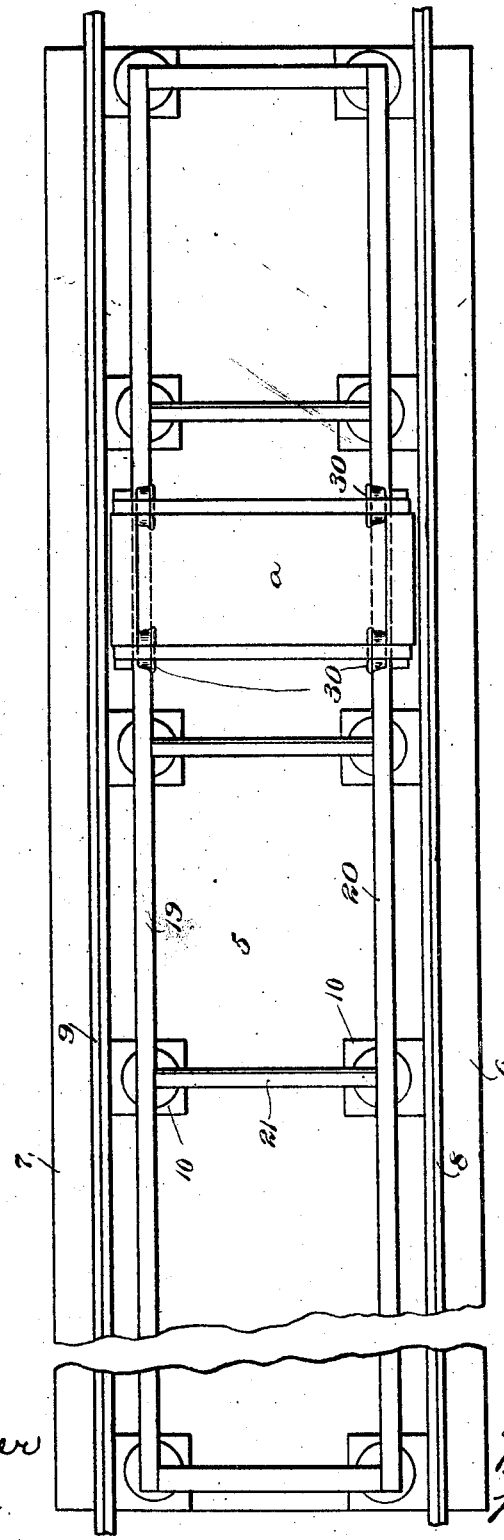

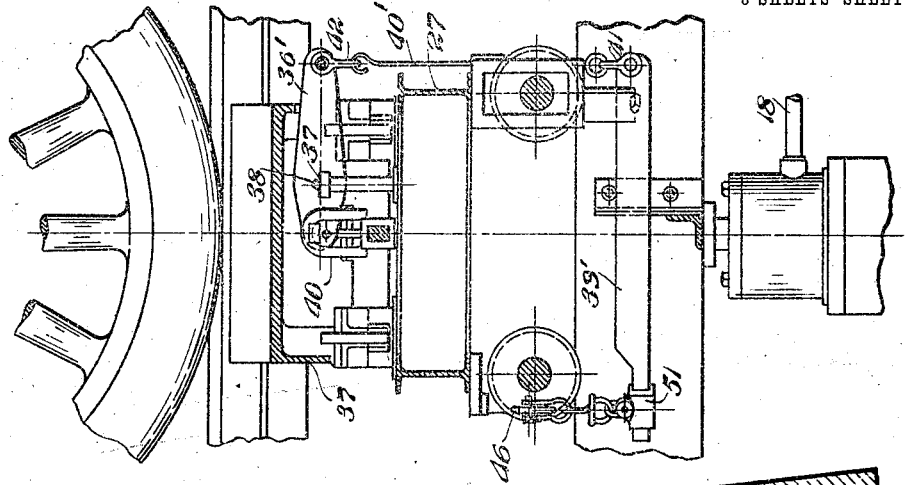

UNITED STATES PATENT OFFICE.

WILLIAM DALTON, OF SCHENECTADY, NEW YORK.

TRACK-SCALE.

1,028,194.   Specification of Letters Patent.   Patented June 4, 1912.

Application filed February 23, 1911. Serial No. 610,202.

*To all whom it may concern:*

Be it known that I, WILLIAM DALTON, a citizen of the United States, and resident of Schenectady, in the county of Schenectady and State of New York, have invented certain new and useful Improvements in Track-Scales, of which the following is a specification.

This invention relates to improvements in track scales for weighing locomotives or analogous objects.

The primary object of the invention is to increase the efficiency of track scales by providing a sectional platform made up of a plurality of independent scales which may be adjusted to various distances apart, to conform to the distances between the wheels on either side of the object to be weighed, whereby the total weight of the object, or the weight supported by any pair of wheels thereof, may be readily determined.

The above and other objects will be better understood from the following description taken in connection with the accompanying drawings, in which:

Figure 1 is a plan view of a railroad track scale embodying my invention. Fig. 2 is an end view of the same partly in section and partly in elevation. Fig. 3 is a detail sectional side view. Fig. 4 is a detail sectional end view of the upper portion of the platform in elevated position. Fig. 5 is a view similar to Fig. 2 illustrating a modification.

Referring to Figs. 1 to 4 inclusive the scale pit 5 may be of any required length and width according to the character of the objects to be weighed and the gage of the road. The upper surfaces of the side walls 6 and 7 of the pit are preferably in a plane with the road bed and support the rails 8 and 9 which form stationary sections of the main track or switch as the case may be. Arranged in spaced relation on either side of the pit 5 and bearing on the bottom of the latter are a plurality of pedestals 10. The pedestals support a plurality of hydraulic lifting jacks, each of which includes a hollow cylinder 11 closed at its lower end as shown at 12 and provided at its opposite end with a head 13 which is secured in any preferred manner to the cylinder such as by bolts 14. Arranged in the cylinder is a plunger 15 having a plunger rod 16, one end portion of which extends through an opening in the head 13 and is provided with a bearing plate 17. As shown in Fig. 2 the length of the plunger rod is somewhat greater than the length of the cylinder bore so that when the lower end of the plunger bears on the bottom 12 a space will exist between the lower surface of the plate 17 and adjacent surface of the cylinder cover 13. The cylinders may be connected together in any preferred manner, but are herein shown connected in series by pipe sections 18 which are tapped into opposite portions of the cylinders, as shown in Fig. 3. The piping 18 is connected with a pump or other suitable source of hydraulic pressure.

Supported on the bearing plate 17 is a track comprising channeled rails 19 and 20 connected at intervals by cross bars 21, which serve to strengthen and prevent independent movement of the rails. Lateral movement of the track is prevented by means of bearing plates 22 secured to the outer surfaces of the rails 19 and 20, and the outer end portions of which are provided with heads 24 which bear on vertical metal strips 25 embedded in the side walls 6 and 7.

Arranged to travel on the track just described are a plurality of weighing scales $a$ of the platform type. The body portion of each scale is made up of a plurality of spaced I-beams 26 extending longitudinally of the pit and connected together at suitable intervals by transversely disposed I-beams 27. Depending from the opposite end portions of the outer beams 26 are hangers 28.
The hangers 28 constitute boxings that receive the opposite ends of axles 29 carrying flanged wheels 30 which bear on the tread surfaces of the rails 19 and 20. The flooring 31 is supported by means of the primary levers 32, the outer ends of these levers extending between fulcrum blocks 33 and having knife edges 34 to bear on said blocks; the flooring 31 has depending webs 35 which bear on knife edges 36 carried by the levers 32 at points remote from the knife edges 34. A secondary lever 36′ extends at right angles to, and between the adjacent ends of, the levers 32 and is arranged between pedestals 37 carried by the body, the said secondary lever having a knife edge 38 to bear on the pedestals 37. The inner end portion of the secondary lever 36′ is provided with a knife edge 39 which is engaged by yokes 40 carried by the inner ends of the primary levers 32. The outer end portion of the secondary lever extends through a slot formed in the skirt 37 of the flooring and is connected to one end of a steel yard 39' by means of a link 40' whose opposite ends are provided with eyes which engage clevises 41 and 42 carried by the steel yard and secondary lever respectively. The steel yard extends between two sections 43 and 44 of a hanger rod depending from one of the beams 27, the said steel yard having knife edges 45 which bear on the lower ends of the sections 43 and 44. The scale beam 46 is provided with a clevis 47 which engages a bracket 48 on one of the beams 27, the free end portion of the beam passing through a clevis 49 secured to a bracket 50 on one of the said beams. The end of the steel yard remote from the fulcrum thereof is provided with a yoke 51 and connection between this yoke and a clevis 52 on the scale beam is established by means of a link 53.

Arranged on the upper surface of the flooring 31 and extending longitudinally of the pit are chock blocks 54 and 55. These blocks are arranged at the opposite ends of the platform so as to engage the flanges of oppositely disposed wheels when the flooring moves upward.

In use and assuming that the total weight of a locomotive is to be determined, as many scales are placed upon the rails 19 and 20 as there are wheels on one side of the locomotive. These scales are then adjusted along the track until the chock blocks are in alinement with the vertical centers of the wheels, after which liquid is forced into the cylinders, whereupon the plungers, track and scales will move upward. During the upward movement of these parts the blocks will engage the flanges 56 of the wheels and the latter with the parts they support will be moved to the position shown in Fig. 4. The weighing of the locomotive can now be effected. When it is desired to determine the weight supported by any particular pair or pairs of wheels the required number of scales are adjusted as before described under the particular set or sets of wheels and the parts operated in the manner before described.

It will be evident that I may use any suitable form of lifting means in lieu of the hydraulic jacks heretofore described. Thus in Fig. 5 I have illustrated screw jacks 60 which are operated by worm gears 61 driven by suitable trains of gearing from a common power shaft 62. This shaft may be driven by any suitable motive power capable of moving it in either direction. On the jacks 60 rest rails 63, corresponding to the rails 19, 20 of the form above described. The rails 63 are maintained parallel while permitting of a limited vertical movement, by means of links 64 connecting them to supports upon the walls 6, 7.

My invention does not depend for its novelty either upon the specific form of jacks employed or upon the specific form of scales employed and these devices may be varied without departing from the spirit and scope of the invention.

Having thus described my invention what I claim as new and desire to secure by Letters-Patent is:

1. An apparatus of the class described comprising a stationary track, a movable track between the rails of the stationary track, a weighing scale arranged to move on said movable track, said weighing scale being adapted to engage an object on said stationary track at points on opposite sides of the center of the stationary track.

2. In a railroad track scale, in combination with a stationary track, of a movable track, and a scale movable along the movable track and operated by the latter to engage an object on the stationary track at points on opposite sides of the center of the track.

3. An apparatus of the class described comprising a stationary track, a vertically movable track, a plurality of weighing scales movable on said movable track and each adapted to engage an object on the stationary track at opposite sides of the center of the stationary track, and means for moving said movable track whereby said scales are adapted to act simultaneously.

4. An apparatus of the class described comprising a stationary track, a vertically movable track, a sectional platform, the sections thereof being independently movable on said movable track and having independent weighing mechanisms associated therewith, means on said platforms adapted to engage objects on said stationary track at opposite sides of the center of the latter, and means for moving said movable track.

5. An apparatus of the class described comprising a stationary track arranged above a pit, a vertically movable track in said pit extending parallel with said stationary track, a plurality of independently movable weighing scales mounted on said movable track and each provided with a platform extending across said pit and having means thereon adapted to engage an object on said stationary track at points on opposite sides of the center of the stationary track.

6. A railroad track scale arranged in a scale pit between the rails of the track, oppositely disposed bearing plates on the side walls of the pit, a vertically movable supporting track having lateral extensions bearing on said plates, and a weighing scale movable on said track.

7. A railroad track scale arranged in a scale pit between the rails of the track, a vertically movable track having lateral extensions bearing on opposite walls of said pit, and a plurality of weighing scales movable on said track.

8. An apparatus of the class described comprising a stationary track arranged above a pit, a vertically movable track in said pit and parallel with said stationary track, a plurality of weighing scales independently movable on said movable track and each provided with a platform extending across said pit and adjacent to said rails, weighing mechanism associated with each of said platforms and positioned below the same, and means on said platform for engaging an object on said stationary track.

9. An apparatus of the class described comprising a stationary track arranged above a pit, a vertically movable track in said pit and parallel with said stationary track, a plurality of weighing scales independently movable on said movable track and each provided with a platform extending across said pit, independent weighing mechanisms associated with each of said platforms, laterally arranged guiding means for guiding said movable track, and means for elevating and depressing said movable track.

10. An apparatus of the class described comprising a stationary track arranged above a pit, a vertically movable support arranged in the pit, a weighing scale movable along said support, upright guides in said pit, and means on said support adapted to engage said guides.

11. An apparatus of the class described comprising a stationary track arranged above a pit, a vertically movable track in said pit, a scale car on said track, bearings in said pit, and means associated with said movable track and engaging said bearings to guide the track.

In testimony whereof I affix my signature in presence of two witnesses.

WILLIAM DALTON.

Witnesses:
 FRANK T. BRIGGS,
 HENRY LINDENKOHL.